United States Patent
Johnson et al.

(10) Patent No.: US 11,597,085 B2
(45) Date of Patent: Mar. 7, 2023

(54) LOCATING AND ATTACHING INTERCHANGEABLE TOOLS IN-SITU

(71) Applicant: The Charles Stark Draper Laboratory, Inc., Cambridge, MA (US)

(72) Inventors: David M. S. Johnson, Cambridge, MA (US); Syler Wagner, Somerville, MA (US); Justin Rooney, New York, NY (US); Steven Lines, Brookline, MA (US); Anthony Tayoun, Cambridge, MA (US); Mitchell Hebert, Littleton, CO (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 11 days.

(21) Appl. No.: 16/570,915

(22) Filed: Sep. 13, 2019

(65) Prior Publication Data
US 2020/0086437 A1 Mar. 19, 2020

Related U.S. Application Data (60) Provisional application No. 62/731,398, filed on Sep. 14, 2018, provisional application No. 62/730,918, (Continued)

(51) Int. Cl.
*B25J 9/16* (2006.01)
*G05B 19/40* (2006.01)
(Continued)

(52) U.S. Cl.
CPC .......... *B25J 9/1666* (2013.01); *B25J 9/0009* (2013.01); *B25J 9/16* (2013.01); *B25J 9/161* (2013.01);
(Continued)

(58) Field of Classification Search
CPC .............. B25J 9/16; B25J 11/00; G05B 22/19
See application file for complete search history.

(56) References Cited

U.S. PATENT DOCUMENTS 4,512,709 A 4/1985 Hennekes
4,513,709 A 4/1985 Hennekes
(Continued)

FOREIGN PATENT DOCUMENTS

CN 106313068 A 1/2017
CN 107092209 A 8/2017
(Continued)

OTHER PUBLICATIONS

Anandan, T.M., "The Shrinking Footprint of Robot Safety", Robotics Online, Oct. 6, 2014. https://www.robotics.org/content-detail.cfm/Industrial-Robotics-Industry-Insights/The-Shrinking-Footprint-of-Robot-Safety/content_id/5059.
(Continued)

*Primary Examiner* — Kira Nguyen
(74) *Attorney, Agent, or Firm* — Hamilton, Brook, Smith & Reynolds, P.C.

(57) ABSTRACT

Current technologies allow a robot to acquire a tool only if the tool is in a set known location, such as in a rack. In an embodiment, a method and corresponding system, can determine the previously unknown pose of a tool freely placed in an environment. The method can then calculate a trajectory that allows for a robot to move from its current position to the tool and attach with the tool. In such a way, tools can be located and used by a robot when placed at any location in an environment.

20 Claims, 5 Drawing Sheets
(3 of 5 Drawing Sheet(s) Filed in Color)

Related U.S. Application Data filed on Sep. 13, 2018, provisional application No. 62/730,703, filed on Sep. 13, 2018, provisional application No. 62/730,934, filed on Sep. 13, 2018, provisional application No. 62/730,933, filed on Sep. 13, 2018, provisional application No. 62/730,947, filed on Sep. 13, 2018.

(51) Int. Cl.

| | | |
|---|---|---|
| B25J 13/00 | (2006.01) | |
| B25J 13/08 | (2006.01) | |
| G06N 3/08 | (2023.01) | |
| G10L 15/22 | (2006.01) | |
| B65G 1/137 | (2006.01) | |
| B25J 9/00 | (2006.01) | |
| B25J 15/00 | (2006.01) | |
| G06Q 10/0631 | (2023.01) | |
| B25J 11/00 | (2006.01) | |
| B25J 15/04 | (2006.01) | |
| B25J 19/02 | (2006.01) | |
| G05D 1/02 | (2020.01) | |
| B25J 19/00 | (2006.01) | |
| G06V 40/20 | (2022.01) | |
| H04L 67/12 | (2022.01) | |
| G05B 19/4061 | (2006.01) | |
| A47J 44/00 | (2006.01) | |

(52) U.S. Cl.
CPC .......... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(56) References Cited

U.S. PATENT DOCUMENTS

| | | |
|---|---|---|
| 4,604,787 A | 8/1986 | Silvers |
| 4,611,377 A | 9/1986 | McCormick |
| 4,624,043 A | 11/1986 | Bennett |
| 4,676,142 A | 6/1987 | McCormick |
| 4,875,275 A | 10/1989 | Hutchinson et al. |
| 4,896,357 A | 1/1990 | Hatano |
| 4,904,514 A | 2/1990 | Morrison et al. |
| 5,018,266 A | 5/1991 | Hutchinson et al. |
| 5,044,063 A | 9/1991 | Voellmer |
| 5,131,706 A | 7/1992 | Appleberry |
| 5,136,223 A | 8/1992 | Karakama |
| 5,360,249 A | 11/1994 | Monforte et al. |
| 5,396,346 A | 3/1995 | Nakayama |
| 5,774,841 A | 6/1998 | Salazar et al. |
| 5,879,277 A | 3/1999 | Dettman et al. |
| 6,223,110 B1 | 4/2001 | Rowe et al. |
| 6,427,995 B1 | 8/2002 | Steinwall |
| 6,569,070 B1 | 5/2003 | Harrington et al. |
| 6,678,572 B1 | 1/2004 | Oh |
| 8,095,237 B2 | 1/2012 | Habibi et al. |
| 9,186,795 B1 | 11/2015 | Edsinger et al. |
| 9,189,742 B2 | 11/2015 | London |
| 9,259,840 B1 | 2/2016 | Chen |
| 9,346,164 B1* | 5/2016 | Edsinger ................ B25J 9/1694 |
| 9,427,876 B2 | 8/2016 | Mozeika et al. |
| 9,615,066 B1 | 4/2017 | Tran et al. |
| 9,621,984 B1 | 4/2017 | Chu |
| 9,659,225 B2* | 5/2017 | Joshi ..................... G06K 9/344 |
| 9,744,668 B1 | 8/2017 | Russell et al. |
| 9,547,306 B2 | 10/2017 | Sepulveda |
| 9,800,973 B1 | 10/2017 | Chatot et al. |
| 9,801,517 B2 | 10/2017 | High et al. |
| 10,131,053 B1 | 11/2018 | Sampedro et al. |
| 10,427,306 B1 | 10/2019 | Quinlan et al. |
| 11,016,491 B1 | 5/2021 | Millard |
| 11,116,593 B2 | 9/2021 | Hashimoto et al. |
| 11,351,673 B2* | 6/2022 | Zito .................... G06Q 10/087 |
| 2002/0144565 A1 | 10/2002 | Ambrose |
| 2002/0151848 A1 | 10/2002 | Capote et al. |
| 2002/0158599 A1 | 10/2002 | Fujita |
| 2002/0181773 A1 | 12/2002 | Higaki et al. |
| 2003/0060930 A1 | 3/2003 | Fujita |
| 2004/0039483 A1 | 2/2004 | Kemp et al. |
| 2004/0172380 A1 | 9/2004 | Zhang |
| 2005/0004710 A1 | 1/2005 | Shimomura et al. |
| 2005/0193901 A1 | 6/2005 | Buehler |
| 2005/0171643 A1 | 8/2005 | Sabe et al. |
| 2005/0283475 A1 | 12/2005 | Beranik |
| 2006/0137164 A1* | 6/2006 | Kraus ..................... B25J 9/1684 29/407.1 |
| 2006/0141200 A1 | 6/2006 | D'Amdreta |
| 2006/0165953 A1 | 7/2006 | Castelli |
| 2007/0233321 A1 | 10/2007 | Suzuki |
| 2007/0274812 A1* | 11/2007 | Ban ........................ B25J 9/1697 414/217 |
| 2007/0276539 A1* | 11/2007 | Habibi .................. B25J 9/1697 700/245 |
| 2008/0059178 A1 | 3/2008 | Yamamoto et al. |
| 2008/0161970 A1* | 7/2008 | Adachi .................. B25J 9/1676 700/253 |
| 2008/0177421 A1 | 7/2008 | Cheng et al. |
| 2008/0201016 A1 | 8/2008 | Finlay |
| 2008/0237921 A1 | 10/2008 | Butterworth |
| 2009/0075796 A1 | 3/2009 | Doll |
| 2009/0292298 A1 | 11/2009 | Lin et al. |
| 2010/0114371 A1* | 5/2010 | Tsusaka .................. B25J 9/0084 700/250 |
| 2010/0292707 A1 | 11/2010 | Ortmaier |
| 2011/0060462 A1 | 3/2011 | Aurnhammer et al. |
| 2011/0125504 A1 | 5/2011 | Ko et al. |
| 2011/0238212 A1 | 9/2011 | Shirado et al. |
| 2011/0256995 A1 | 10/2011 | Takazakura et al. |
| 2012/0016678 A1 | 1/2012 | Gruber |
| 2012/0255388 A1 | 10/2012 | McClosky |
| 2012/0290134 A1 | 11/2012 | Zhao et al. |
| 2013/0079930 A1 | 3/2013 | Mistry |
| 2013/0103198 A1 | 4/2013 | Nakamoto et al. |
| 2013/0103918 A1 | 4/2013 | Dictos |
| 2014/0067121 A1 | 3/2014 | Brooks |
| 2014/0163736 A1 | 6/2014 | Azizian et al. |
| 2014/0316636 A1 | 10/2014 | Hong et al. |
| 2015/0032260 A1 | 1/2015 | Yoon et al. |
| 2015/0051734 A1 | 2/2015 | Zheng |
| 2015/0052703 A1 | 2/2015 | Lee et al. |
| 2015/0114236 A1 | 4/2015 | Roy |
| 2015/0148953 A1 | 5/2015 | Laurent et al. |
| 2015/0149175 A1 | 5/2015 | Hirata et al. |
| 2015/0178953 A1 | 5/2015 | Laurent |
| 2015/0277430 A1 | 10/2015 | Linnell et al. |
| 2015/0375402 A1 | 12/2015 | Andreta |

(56) References Cited

U.S. PATENT DOCUMENTS

| | | |
|---|---|---|
| 2016/0016315 A1 | 1/2016 | Kuffner et al. |
| 2016/0073644 A1 | 3/2016 | Dickey |
| 2016/0075023 A1 | 3/2016 | Sisbot |
| 2016/0103202 A1 | 4/2016 | Sumiyoshi et al. |
| 2016/0291571 A1 | 10/2016 | Cristiano |
| 2016/0372138 A1 | 12/2016 | Shinkai et al. |
| 2017/0004406 A1 | 1/2017 | Aghamohammadi |
| 2017/0080565 A1 | 3/2017 | Dalibard et al. |
| 2017/0087722 A1 | 3/2017 | Aberg et al. |
| 2017/0133009 A1 | 5/2017 | Cho et al. |
| 2017/0168488 A1 | 6/2017 | Wierzynski |
| 2017/0178352 A1 | 6/2017 | Harmsen et al. |
| 2017/0326728 A1* | 11/2017 | Prats ............... B25J 9/1612 |
| 2017/0334066 A1 | 11/2017 | Levine |
| 2017/0354294 A1 | 12/2017 | Shivaiah |
| 2017/0361461 A1 | 12/2017 | Tan |
| 2017/0361468 A1 | 12/2017 | Cheuvront et al. |
| 2018/0043952 A1 | 2/2018 | Ellerman et al. |
| 2018/0056520 A1 | 3/2018 | Ozaki |
| 2018/0070776 A1* | 3/2018 | Ganninger ............... A21C 9/08 |
| 2018/0121994 A1 | 5/2018 | Matsunaga et al. |
| 2018/0144244 A1 | 5/2018 | Masoud et al. |
| 2018/0147718 A1* | 5/2018 | Oleynik ............... G05B 19/42 |
| 2018/0147723 A1 | 5/2018 | Vijayanarasimhan |
| 2018/0150661 A1 | 5/2018 | Hall et al. |
| 2018/0200014 A1 | 7/2018 | Bonny et al. |
| 2018/0200885 A1 | 7/2018 | Ikeda et al. |
| 2018/0202819 A1 | 7/2018 | Mital |
| 2018/0214221 A1 | 8/2018 | Crawford et al. |
| 2018/0257221 A1 | 9/2018 | Toothaker et al. |
| 2018/0275632 A1 | 9/2018 | Zhang et al. |
| 2018/0338504 A1 | 11/2018 | Lavri et al. |
| 2018/0345479 A1 | 12/2018 | Martino et al. |
| 2018/0348783 A1* | 12/2018 | Pitzer ............... G05D 1/0246 |
| 2018/0354140 A1 | 12/2018 | Watanabe |
| 2019/0001489 A1 | 1/2019 | Hudson et al. |
| 2019/0039241 A1 | 2/2019 | Langenfeld et al. |
| 2019/0049970 A1 | 2/2019 | Djuric et al. |
| 2019/0056751 A1 | 2/2019 | Ferguson et al. |
| 2019/0066680 A1 | 2/2019 | Woo et al. |
| 2019/0212441 A1 | 7/2019 | Casner et al. |
| 2019/0291277 A1 | 9/2019 | Oleynik |
| 2019/0310611 A1 | 10/2019 | Jain |
| 2019/0321989 A1 | 10/2019 | Anderson et al. |
| 2019/0381617 A1 | 12/2019 | Patrini et al. |
| 2020/0023520 A1* | 1/2020 | Yoshizumi ............... B25J 9/1687 |
| 2020/0030966 A1 | 1/2020 | Hasegawa |
| 2020/0047349 A1 | 2/2020 | Sinnet et al. |
| 2020/0073358 A1 | 3/2020 | Dedkov et al. |
| 2020/0073367 A1 | 3/2020 | Nguyen et al. |
| 2020/0086482 A1 | 3/2020 | Johnson |
| 2020/0086485 A1 | 3/2020 | Johnson |
| 2020/0086487 A1 | 3/2020 | Johnson |
| 2020/0086497 A1 | 3/2020 | Johnson |
| 2020/0086498 A1 | 3/2020 | Johnson |
| 2020/0086502 A1 | 3/2020 | Johnson |
| 2020/0086503 A1 | 3/2020 | Johnson |
| 2020/0086509 A1 | 3/2020 | Johnson |
| 2020/0087069 A1 | 3/2020 | Johnson |
| 2020/0090099 A1 | 3/2020 | Johnson |
| 2020/0070355 A1 | 4/2020 | Neumann et al. |
| 2020/0298403 A1 | 9/2020 | Nilsson et al. |
| 2022/0066456 A1 | 3/2022 | Ebrahimi et al. |

FOREIGN PATENT DOCUMENTS

| | | |
|---|---|---|
| DE | 3723329 A | 1/1988 |
| DE | 3823102 A1 | 1/1990 |
| EP | 138461 A2 | 4/1985 |
| EP | 474881 A1 | 3/1992 |
| EP | 1145804 A1 | 10/2001 |
| EP | 2011610 A2 | 1/2019 |
| FR | 3015334 A1 | 6/2015 |
| GB | 2550396 A | 11/2017 |
| JP | 2004295620 | 10/2004 |
| JP | 200849462 A | 3/2008 |
| JP | 2020028957 | 2/2020 |
| WO | 99/03653 A1 | 1/1999 |
| WO | 2005072917 A1 | 11/2005 |
| WO | 2007/122717 A1 | 11/2007 |
| WO | 2009045827 A2 | 4/2009 |
| WO | 20150117156 | 8/2015 |
| WO | 20170197170 A1 | 11/2017 |
| WO | 20180133861 A1 | 7/2018 |
| WO | 2020056279 A1 | 3/2020 |
| WO | 2020056295 A1 | 3/2020 |
| WO | 2020056301 A1 | 3/2020 |
| WO | 2020056353 A1 | 3/2020 |
| WO | 2020056362 A1 | 3/2020 |
| WO | 2020056373 A1 | 3/2020 |
| WO | 2020056374 A1 | 3/2020 |
| WO | 2020056375 A1 | 3/2020 |
| WO | 2020056376 A1 | 3/2020 |
| WO | 2020056377 A1 | 3/2020 |
| WO | 2020056380 A1 | 3/2020 |

OTHER PUBLICATIONS

Blutinger, J., et al., "Scoop: Automating the Ice Cream Scooping Process", Introduction to Robotics MECE E4602, Group 8 Final Project, Dec. 2016.

Bollini, M., et al., "Interpreting and Executing Recipes with a Cooking Robot", Experimental Robotics, 2013.

Cao, Z., et al. "Realtime Multi-Person 2D Pose Estimation using Part Affinity Fields", Proceedings of the IEEE Conference on Computer Vision and Pattern Recognition. 2017.

Dantam, N.T., et al. "Incremental Task and Motion Planning" A Constraint-Based Approach, Robotics: Science and Systems 12, 00052, 2016.

Ferrer-Mestres, J., et al., "Combined Task and Motion Planning as a Classical AI Planning" arXiv preprint arXiv:1706.06927, 2017—arxiv.org; Jun. 21, 2017.

Kaelbling, L.P, et al., "Integrated task and motion planning in beliefe space" The International Journal of Robotics Research; 0(0) 1-34; 2013.

Martinez, J., et al., "On human motion prediction using recurrent neural networks." Proceedings of the IEEE Conference on Computer Vision and Pattern Recognition. 2017.

Nedunuri, S., et al., "SMT-Based Synthesis of Integrated Task and Motion Plan from Plan Outlines"; the Proceedings of the 2014 IEEE Intl. Conf. on Robotics and Automation (ICRA2014).

Saxena, A., et al., "RoboBrain: Large-Scale Knowledge Engine for Robots", arXiv preprint arXiv:1412.0691 (2014).

Schenck, C., et al., "Learning Robotic Manipulation of Granular Media", 1st Conference on Robot Learning, arXiv:1709.02833, Oct. 25, 2017.

Shimizu, T. and Kubota, T., "Advanced Sampling Scheme Based on Environmental Stiffness for a Smart Manipulator", Robot Intelligence Technology and Applications, pp. 19-208. 2012.

Srivastava, S., et al. "Combined Task and Motion Planning Through an Extensible Planner-Independent Interface Layer"; 2014 IEEE international conference on robotics and automation (ICRA), 639-646.

Stentz, A., et al. "A Robotic Excavator for Autonomous Truck Loading", In Proceedings of the IEEE/RSJ International Conference on Intelligent Robotic Systems, 1998.

Villegas, et al., "Learning to Generate Long-term Future via Hierarchical Prediction", In Proceedings of the 34th International Conference on Machine Learning (ICML), 2017.

Walker, J., et al., "The pose knows: Video forecasting by generating pose futures", In The IEEE International Conference on Computer Vision (ICCV), Oct. 2017.

Watson, J,. Kevin, et al. "Use of Voice Recognition for Control of a Robotic Welding Workcell", IEEE Control Systems Magazine; p. 16-18; (ISSN 0272-1708); 7 , Jun. 1, 1987.

Wong, J.M., et al., "SegICP-DSR: Dense Semantic Scene Reconstruction and Registration", Draper, arXiv:1711.02216; Nov. 6, 2017.

(56) References Cited

OTHER PUBLICATIONS

Wong, J.M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017.
Wu, J., et al., "Real-Time Object Pose Estimation with Pose Interpreter Networks", IEEE/RSJ International Conference on Intelligent Robots and Systems (IROS), 2018.
Ye, G., et al., "Demonstration-Guided Motion Planning" Robotics Research. Springer Tracts in Advanced Robotics, vol. 100, 2017.
International Search Report and Written Opinion for PCT/US2019/051148 dated Dec. 12, 2019 entitled "Food-Safe, Washable, Thermally-Conductive Robot Cover".
Anonymous: "Pate a pizza fine—Notre recette avec photos—Meilleur du Chef," Retrieved from the Internet: URL: https://www.meilleurduchef.com/fr/recette/pate-pizza-fine.html# [retrieved on Dec. 5, 2019].
International Search Report and Written Opinion for PCT/US2019/051176 dated Dec. 12, 2019 entitled "Determining How to Assemble a Meal".
International Search Report and Written Opinion for PCT/US2019/051175 dated Jan. 3, 2020 entitled Stopping Robot Motion Based on Sound Cues.
Dexai Robotics: "Alfred Sous-Chef scooping ice-cream" Youtube, retrieved from Internet Jun. 8, 2018. https://www.youtube.com/watch?v=caNG4qrZhRU.
International Search Report and Written Opinion for PCT/US2019/051179 dated Jan. 9, 2020 entitled "An Adaptor for Food-Safe, Bin-Compatible, Washable, Tool-Changer Utensils".
International Search Report and Written Opinion for PCT/US2019/051177 dated Jan. 9, 2020 entitled "Voice Modification to Robot Motion Plans".
International Search Report and Written Opinino for PCT/US2019/051183 dated Jan. 14, 2020 entitled "Locating And Attaching Interchangeable Tools In-Situ".
International Search Report and Written Opinion for PCT/US2019/051067 dated Jan. 16, 2020 entitled "Robot Interaction With Human Co-Workers".
International Search Report and Written Opinion for PCT/US2019/051161 dated Jan. 15, 2020 entitled "Food-Safe, Washable Interface for Exchanging Tools".
ATI Industrial Automation: Automatic/Robotic Tool Changers, "Automatic/Robotic Tool Changes", Tool Changer News. Downloaded from Internet Feb. 4, 2020. https://www.ati-ia.com/products/toolchanger/robot_tool_changer.aspx.
Dexai Robotics: "A Robot Company is Born", retrieved from Internet from Feb. 5, 2020. https://draper.com/dexai-robotics.
Draper—"A 'Preceptive Robot' Earns Draper Spots as KUKA Innovation Award Finalist" Aug. 30, 2017, retrieved from Internet from Feb. 5, 2020. https://www.draper.com/news-releases/perceptive-robot-earns-draper-spot-kuka-innovation-award-finalist.
"Draper Spins Out Dexai Robotics", Mar. 21, 2019, retrieved from Internet from Feb. 5, 2020. https://www.draper.com/news-releases/draper-spins-out-dexai-robotics.
Dynamic Robotic Manipulation—KUKA Innovation—Finalist Spotlight—Apr. 26, 2018 retrieved from Internet Feb. 5, 2020. https://youtube.com/watch?v=7wGc-4uqOKw.
Siciliano, B., et al. "Chapter 8—Motion Control—Robotics Modelling Planning and Control", In: Robotics Modelling Planning and Control, Dec. 23, 2009.
Siciliano, B., et al. "Chapter 9—Force Control—Robotics Modelling Planning and Control", In: Robotics Modelling Planning and Control, Dec. 23, 2009.
International Search Report and Written Opinion for PCT/US2019/051040 dated Feb. 7, 2020 entitled "Manipulating Fracturable and Deformable Materials Using Articulated Manipulators".
International Search Report and Written Opinion for PCT/US2019/051180 dated Jan. 31, 2020 entitled "One-Click Robot Order".
International Search Report and Written Opinion for PCT/US2019/051061 dated Apr. 3, 2020 titled "Controlling Robot Torque and Velocity Based on Context".
Olin College of Engineering, "Autonomous Tool Changer" Draper 2016-2017, retrieved from Internet Feb. 5, 2020. http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously". Date unknown.
Feddema, John T., et al., Model-Based Visual Feedback Control for a Hand-Eye Coordinated Robotic System, Aug. 1992, IEEE, vol. 25, Issue: 8, pp. 21-31 (Year: 1992).
Yang et al., "Obstacle Avoidance through Deep Networks based Intermediate Perception", Apr. 27, 2017, The Robotics Instiute, Carnegie Mellon University (Year: 2017).
Charabaruk, Nicholas; "Development of an Autonomous Omnidirectional Hazardous Material Handling Robot"; . University of Ontario Institute of Technology (Canada). ProQuest Dissertations Publishing, 2015. 10006730. (Year: 2015).
Langsfeld, Joshua D..; "Learning Task Models for Robotic Manipulation of Nonrigid Objects"; University of Maryland, College Park. ProQuest Dissertations Publishing, 2017. 10255938. (Year: 2017).
Rennekamp, T., et al., "Distributed Sensing and Prediction of Obstacle Motions for Mobile Robot Motion Planning," 2006, IEEE, International Conference on Intelligent Robots and Systems, pp. 4833-4838 (Year: 2006).

\* cited by examiner

LOCATING AND ATTACHING INTERCHANGEABLE TOOLS IN-SITU

RELATED APPLICATIONS

This application claims the benefit of U.S. Provisional Application No. 62/730,933, filed on Sep. 13, 2018, U.S. Provisional Application No. 62/730,703, filed on Sep. 13, 2018, U.S. Provisional Application No. 62/730,947, filed on Sep. 13, 2018, U.S. Provisional Application No. 62/730,918, filed on Sep. 13, 2018, U.S. Provisional Application No. 62/730,934, filed on Sep. 13, 2018 and U.S. Provisional Application No. 62/731,398, filed on Sep. 14, 2018.

This application is related to U.S. patent application Ser. No. 16/570,100, U.S. patent application Ser. No. 16/570,855, U.S. patent application Ser. No. 16/570,955, U.S. patent application Ser. No. 16/571,003, U.S. patent application Ser. No. 16/570,976, U.S. patent application Ser. No. 16/570,736, U.S. patent application Ser. No. 16/571,025, U.S. patent application Ser. No. 16/570,606, U.S. patent application Ser. No. 16/571,040, and U.S. patent application Ser. No. 16/571,041, all filed on the same day, Sep. 13, 2019.

The entire teachings of the above application(s) are incorporated herein by reference.

BACKGROUND

Traditionally, the food industry employs human labor to manipulate food ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients change shape in difficult-to-predict ways rendering traditional methods to move material ineffective.

SUMMARY

Current technologies allow a robot to acquire a tool with its end effector if it is in a set location, such as in a rack. Applicant's disclosure allows a robot to acquire a tool no matter its pose, such that it can be left in the worksite (e.g., in a food container) by determining its pose (e.g., position and rotation with respect to the tool-changer attached to the robot) from an RGB image, a depth image, or a combination of an RGB image and a depth image and calculating a trajectory of the robot from its current pose to an attachment pose.

In an embodiment, a method includes determining, by a computer, a pose of at least one tool, configured to mate with an interface of a robot, within an environment based upon at least one image of the environment. The method also includes determining, by the computer, an attachment pose of the robot interface, based on the determined tool pose and computing, by the computer, a trajectory of the robot that includes moving the robot interface from a first position to the attachment pose and mating the robot interface with the at least one tool.

In some embodiments, determining the tool pose further includes labeling at least one pixel of the at least on image with an object class or a probability distribution of the object class and locating the at least one tool in the segmented image. In such embodiments, locating the at least one tool the tool may further include applying a neural network to the at least one image. The determining the tool pose may further include mapping the located at least one tool to a point cloud based on the depth image, to produce a partial 3D representation of the located at least one tool, comparing the partial 3D representation to a set of models from a model library to find a best matching model, generating multiple hypotheses, each hypothesis including the best matching model at an estimated tool pose, selecting a hypothesis based on a comparison of the multiple hypotheses to the partial 3D representation, and outputting the tool pose of the at least one tool based on the estimated tool pose of the hypothesis selected.

In an embodiment of the method, determining the tool pose of the at least one tool includes applying a scale-invariant transform to the at least one image. In an alternative embodiment determining the tool pose includes identifying a 2D visual code on the at least one tool in the at least one image and determining the tool pose based on an orientation of the 2D visual code.

In an embodiment of the method, the computed trajectory is at least one of free of a collision between the robot and at least one object in the environment, free of causing the at least one tool to move by contacting the at least one tool with the robot prior to reaching the attachment pose, free of the robot contacting an object that applies a force or torque to the at least one tool prior to reaching the attachment pose, causes the robot to interact with the tool to move the tool to a new tool pose that facilitates mating, and aligns the robot interface in the attachment pose where a locking mechanism can be engaged to secure the at least one tool to the robot interface. In an embodiment, the computed trajectory additionally includes moving the robot interface to a drop-off location prior to moving the robot interface to the attachment pose and removing an attached tool from the robot interface at the drop-off location.

In some embodiments, the method further comprises determining, by the computer, an updated tool pose of the at least one tool at a time when determining the pose of at least one tool has been completed, determining, by the computer, an updated attachment pose of the robot interface, based on the updated tool pose and computing, by the computer, an updated trajectory based on the updated attachment pose.

In an embodiment of the method, mating the robot interface with the at least one tool includes performing a peg-in-hole insertion, by a contact-based controller, using at least one of a force and a torque sensor, the insertion employing the determined tool pose as an initial pose estimate of the at least one tool. In such an embodiment, mating the robot interface with the at least one tool may further include employing, by the contact-based controller, a neural network that provides at least one trajectory adjustment while performing the peg-in-hole insertion.

An embodiment of the method further comprises executing, by the robot as an open loop controller, the trajectory. That embodiment may further include determining if the mating was successful based on at least one of a proximity sensor mounted on at least one tool and the robot, visual feedback, force feedback, and torque feedback.

In some embodiments of the method, the attachment pose is within a 1.0 mm distance from a target location, within a 0.8 degree clocking offset, and within a 2.0 degree twisting offset of a target rotational orientation.

An embodiment includes a system capable of carrying out the above described methods, includes a processor and a memory with computer code instructions stored thereon. The processor and the memory, with the computer code instructions, being configured to cause the system to determine a pose of at least one tool, configured to mate with an interface of a robot, within an environment based upon at least one image of the environment, determine an attachment pose of the robot interface, based on the determined tool pose, and compute a trajectory of the robot that includes moving the robot interface from a first position to the attachment pose and mating the robot interface with the at least one tool.

The embodiment of the system where determining the tool pose includes segmenting the RGB image, labeling at least one pixel of the segmented RGB image with an object class or a probability distribution of the object class, and locating the at least one tool in the segmented image. In such an embodiment, determining the tool pose further includes applying a neural network to the located tool in the segmented image. In such an embodiment, determining the pose may further include mapping the located at least one tool to a point cloud based on the depth image, to produce a partial 3D representation of the located at least one tool, comparing the partial 3D representation to a set of models from a model library to find a best matching model, generating multiple hypotheses, each hypothesis including the best matching model at an estimated tool pose, selecting a hypothesis based on a comparison of the multiple hypotheses to the partial 3D representation, and outputting the tool pose of the at least one tool based on the estimated tool pose of the hypothesis selected.

In an embodiment of the system, determining the pose of the at least one tool includes applying a scale-invariant feature transform to the at least one image. In an embodiment of the system, determining the pose of the at least one tool includes identifying a 2D visual code on the at least one tool in the at least one image and determining the pose based on an orientation of the 2D visual code.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Operating a robot in a quick service food environment, such as a fast food restaurant, can be challenging for a number of reasons. First, the end effectors e.g., utensils, that the robot uses need to remain clean from contamination. Contamination can include allergens (e.g., peanuts), food preferences (e.g., contamination from pork for a vegetarian or kosher customer), dirt/bacteria/viruses, or other non-ingestible materials (e.g., oil, plastic, or particles from the robot itself). Second, the temperature of the robot should be controlled without sacrificing cleanliness. Third, the robot should be able to manipulate fracturable and deformable materials, and further be able to measure an amount of material controlled by its utensil. Fourth, the robot should be able to automatically and seamlessly switch utensils (e.g., switch between a ladle and tongs). Fifth, the utensils should be adapted to be left in an assigned food container and interchanged with the robot as needed, in situ. Sixth, the interchangeable parts (e.g., utensils) should be washable or dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to apply a correct amount of torque based on parameters (e.g., density and viscosity) of the foodstuff to be gathered. Tenth, the system should be able to receive an electronic order from a user, assemble the meal for the user, and place the meal for the user in a designated area for pickup automatically.

Tool changers for robots require the tool and robot interface to be accurately aligned in both position (~+/−1 mm) and rotation (~+/−0.8 deg clocking offset, and +/−2 deg twisting offset) before the locking mechanism can be successfully actuated. In unstructured environments, it is a challenging task to both recognize and localize an object, even if that object is known to the system beforehand. In this context, 'to recognize' means to assign which pixels in at least one sensor image correspond to the desired object. In some embodiments the sensor image includes a color RBG image and/or depth image. In this context, 'to localize' means to identify a linear transformation which moves the known object from the origin in the camera frame to its current observed position. The pose of the object in the camera frame is sufficient to describe the object's location in any other frame, if there is a known transformation between that frame and the camera frame. Finally, in this context, 'known' refers to having an existing 3D model or other representation which enables the user to assign a specific pose to an orientation of the object. In other words, a known transformation includes a pre-defined origin and axes alignment with respect to the physical object.

To use a tool-changer with objects in an unstructured environment, a robot should be able to either: (a) observe the tool, (b) compute its pose with sufficient accuracy that an open-loop trajectory can be created to maneuver the arm from its current location to the mating position with the tool, and/or (c) make an observation of the tool's location that is insufficiently accurate for an open loop mating trajectory, but accurate enough to maneuver close enough to the tool where force/torque feedback can be used to begin engaging in a closed-loop capture behavior where the mating position is achieved by moving in response to force/torque feedback from contact between the interface and the tool.

This disclosure includes a system to recognize, localize, and attach a tool to a robot interface in an environment where the location of the desired tool is not known beforehand. In some embodiments, the robot interface may be a master tool changer configured to attached to multiple tools. The system consists of a tool/end effector localization and pose determination mechanism, a trajectory module, and optionally a closed-loop tactile feedback system used to assist in mating the interface with the tool. The localization and pose determination mechanism and/or the trajectory module may be computed implemented methods implemented by a memory with computer code instructions stored thereon and a processor.

The localization mechanism determines the pose of the tool from information gathered external sensor or other input which provides an estimate of the pose of the tool. While the pose of the tool is unknown beforehand, in some embodiments, the type, size, and visual characteristics of the tool are known. In such embodiments, the type, size, and visual characteristics of the tool can be stored in a database accessible by the localization mechanism.

Based on the pose estimate of the tool, the system computes a trajectory or chooses from a set of pre-computed trajectories to move the robot from its current position and pose to an attachment position and pose. At the attachment position and pose, a mating action is executed connecting the robot's interface to the tool. In some embodiments the mating motion can be incorporated into the trajectory. Alternatively, the mating/attachment motion can be performed as a peg-in-hole insertion process.

The computed trajectory may be computed to avoid collision with any other objects in the environment. The computed trajectory may also approach the tool as to not shift the position of the tool such that the mating position cannot be achieved. Alternatively, the computed may be chosen so that it interacts with the tool to facilitate achieving the attachment position (for example, by pressing the tool against a container so as to allow the robot to exert a torque or force on the tool that is not be possible in free space without interacting with the environment).

The system may also be equipped with a closed-loop, contact (or tactile) based controller which, based on: (a) a signal from either torque sensors in the robot joints, (b) a force/torque sensor mounted at the wrist of the robot, or (c) an externally mounted force/torque sensor on the tool, adjusts the trajectory of the robot, after the robot has reached the attachment position/pose to successfully mate the robot interface with the tool.

Figure 1:
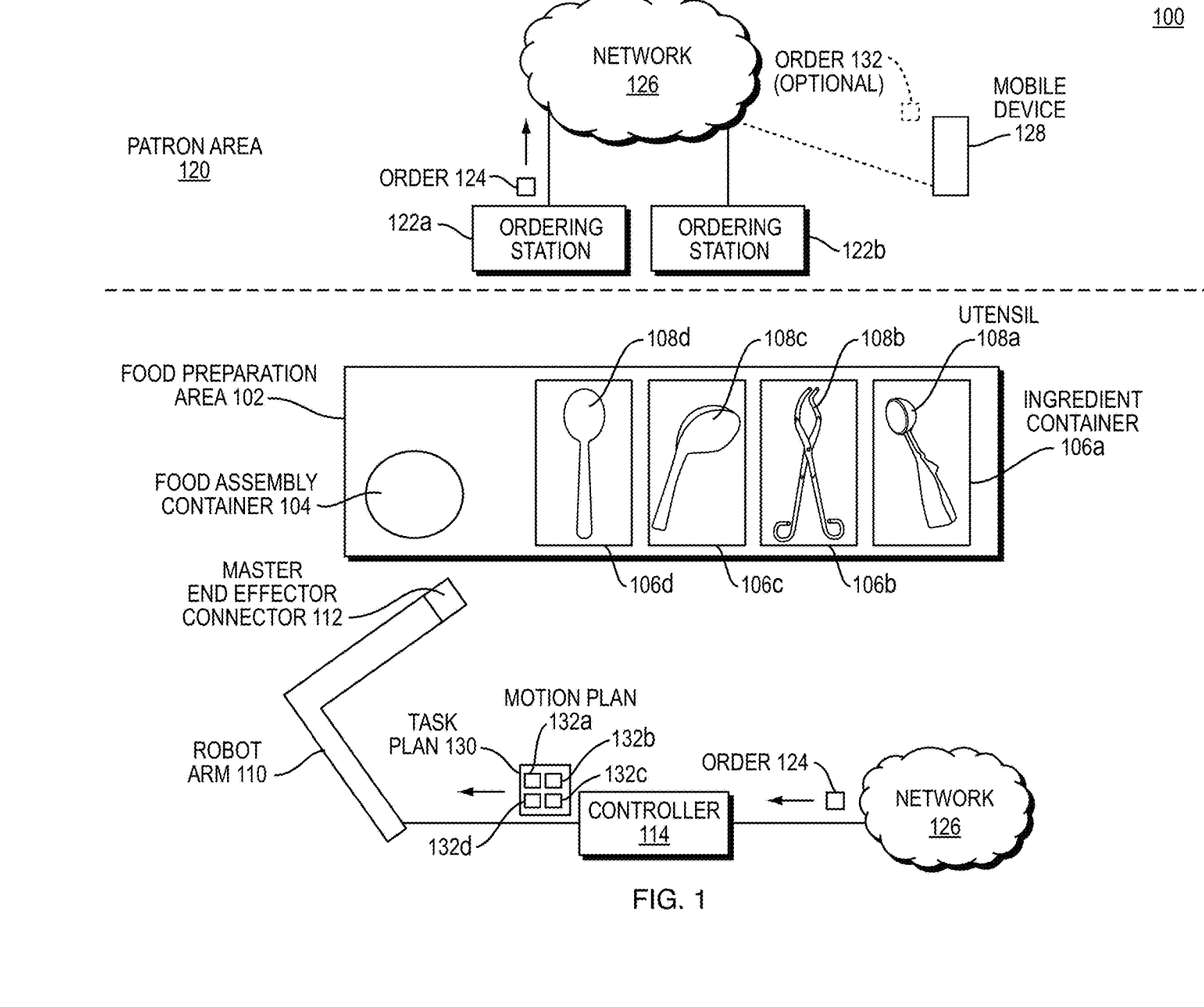
FIG. 1 is a block diagram illustrating an example embodiment of a quick service food environment of embodiments of the present disclosure.

FIG. 1 is a block diagram illustrating an example embodiment of a quick service food environment 100 of embodiments of the present invention. The quick service food environment 100 includes a food preparation area 102 and a patron area 120.

The food preparation area 102 includes a plurality of ingredient containers 106a-d each having a particular foodstuff (e.g., lettuce, cheese, guacamole, beans, ice cream, various sauces or dressings, etc.). Each ingredient container 106a-d stores in situ its corresponding utensil 108a-d. The utensils 108a-d can be spoons, ladles, tongs, dishers (scoopers), or other utensils. Each utensil 108a-d is configured to mate with and disconnect from an interface such as a master end effector connector 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and pitch, roll, yaw) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 112a-b, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132a-d for the robot arm 110 to execute. Each motion plan 132a-d is a plan for the robot arm 110 to engage with a respective utensil 108a-d, gather ingredients from the respective ingredient container 106a-d, and empty the utensil 108a-d in an appropriate location of a food assembly container 104 for the consumer, which can be a plate, bowl, or other container. The robot arm 110 then returns the utensil 108a-d to its respective ingredient container 106a-d, or other location as determined by the task plan 130 or motion plan 132a-d, and releases the utensil 108a-d. The robot arm executes each motion plan 132a-d in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

A robot operating with a variety of interchangeable end-effector tools classically uses a dedicated physical tool changer interface, where each tool has a fixed position relative to the robot when not in use. For example, tools are stored in a rack, where each tool has a designated position on the rack so that the robot knows the tool is in that position when not in use. The system and method contained in this disclosure, locates the tools during robot operation and therefore, bypasses the need for such a dedicated and cumbersome physical tool changer interface. In an embodiment, such a perception system enables a robot to autonomously locate a set of end effector tools in its workspace and attach them without the set of end effector tools having a fixed or designated position.

A vision system captures at least image of the workspace containing the tools. The at least one image can include a color image and a depth image. In some embodiments, the color image is an RGB image.

A perception pipeline, or other mechanism, extracts the pose of each tool in the image. A person of ordinary skill in the art can understand that pose is the position (e.g., X-, Y-, and Z-coordinates) and orientation (e.g., roll, pitch, and yaw) of the object. If the pose is determined in the coordinate of image, the coordinates can be transformed into world coordinates. The system and method of the disclose includes determining the pose of the tools can with a variety of methods. For example, some embodiments of the method determine the pose of the tools by applying a scale-invariant transform to the image and matching outlines and edges in the image with known values of tools. Once the pose of a tool of interest is determined, the robot arm can calculate and execute a trajectory to move an interface located at the end of the robot arm to an attachment pose aligned with the tool. When the interface is located at the attachment pose the interface can be mated with the tool.

Figure 2:
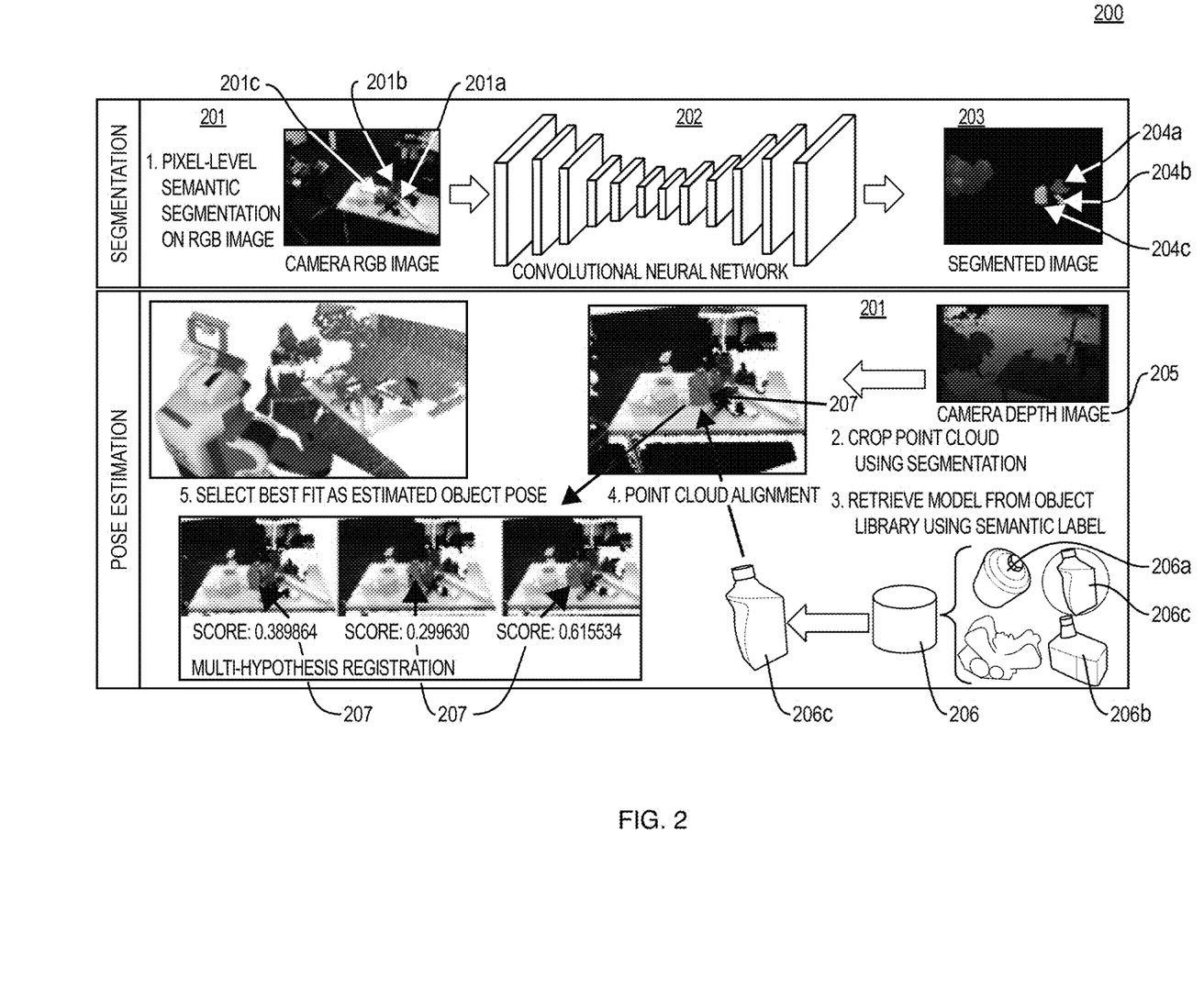
FIG. 2 is a flow diagram illustrating an example embedment of the disclosed method that utilizes Segmentation and Iterative Closest Point (ICP) (SegICP) to determine the pose of a tool.

FIG. 2 is a flow diagram illustrating an example embedment 200 of the disclosed method that utilizes Segmentation and Iterative Closest Point (ICP) (SegICP) to determine pose of a tool. FIG. 2 shows an example embodiment method that segments an image using a convolutional neural network and estimating the pose of an objected identified in the segmented image using an Iterative Closest Point method. However, any combination of segmentation, and pose estimation procedures can be utilized.

The first step includes capturing a color image 201 of an environment containing at set of tools including first tool 201a, second tool 201b, and third tool 201c. The image may be captured by a camera that produces and RGB image. The camera may be a red, green, blue depth (RGBD) camera. The image 201 is segmented to produce segmented image 203. To produce segmented image 203, the system labels the pixels of the image 201 with a category. Each category corresponds to an object type (e.g., bench, floor, spoon, lettuce, counter-top, unknown, etc . . . ). Alternatively, the pixels may be labeled with a category corresponding to a probability distribution of the object type. The number, type, and identity of the categories is determined by the number of objects that the system needs to perform its assigned manipulation task. The SegICP method performs pixel-level semantic segmentation on the image 201 using a convolutional neural network 202 to produce the segmented image 203. A person of ordinary skill in the art can understand that a variety of methods and neural networks can produce segmented image 203. The convolutional neural network may be a SegNet, Atrous Convolution, or DRN neutral network. Alternatively, image 201 may be segmented without the use of a a convolutional neural network 202.

In segmented image 203, sets of pixels 204a, 204b, 204c are each labeled with their own category. When segmentation is performed correctly, the set of pixels 204a, 204b, 204c in segmented image 203 should correspond to the tools 201a, 201b, and 201c in original image 201. For example, set of pixels 204c, correspond to the location of third tool 201c.

After segmentation is performed, the pose of tools 201a, 201b, and 201c can be determined, using the segmented image 203 and set of pixels 204a, 204b, 204c. The following description focuses on determining the pose of third tool 201c using a corresponding set of pixels 204c. However, it is evident to a person skilled in the art that the method can be applied to any tool within the image 201. The set of pixels 204c labelled with a category corresponding to the desired tool, third tool 201c, are passed to a pose a pose-extraction method/module. The SegICP method uses an interactive Closest Point method for pose estimation.

Depth image 205 provides a point cloud. The point cloud from the depth image 205 is cropped using the segmented image 203. Models 206a, 206b, 206c are retrieved from the object library 206. The best fitting model 206c for third tool 201c is identified using the category labeling the corresponding set of pixels 204c. A partial 3D representation of the desired third tool 201c can be generated from the cropped point cloud from depth image 205.

The system generates multiple hypotheses of the model 206c at a range estimated poses. FIG. 2 illustrates three multiple hypotheses 207, overlaid on image 201. The system compares the hypothesis 207 of model 206c to the partial 3D representation of third tool 201c using a regression analysis. A person skilled in the art would know that any number of hypotheses 207 can be generated and compared to the partial 3D representation of third tool 201c. The hypothesis that places model 206c at a pose that best matches the actual pose of the third tool 201c has the best regression score and is selected as the best hypothesis. The actual pose of third tool 201c can be determined from the estimated pose of model 206c in the best hypothesis.

Tools 201a, 201b, and 201c in original image 201 may also be identified using a bounding box either in combination with pixel labeling or without any other complimentary methods. A bound box method may utilize any methods known to those skilled in the art such as YOLO and Mask R-CNN.

The disclosure includes a method of to determine the pose of tools in an environment using unique visual tags mounted on each of the tools. In some embodiments, the visual tags are Aruco tags, and the pose can be extracted from an image of the tools and tag using the Aruco library. Said visual tag method can further be combined with the methods above, as understood by a person of ordinary skill in the art.

Figure 3A:
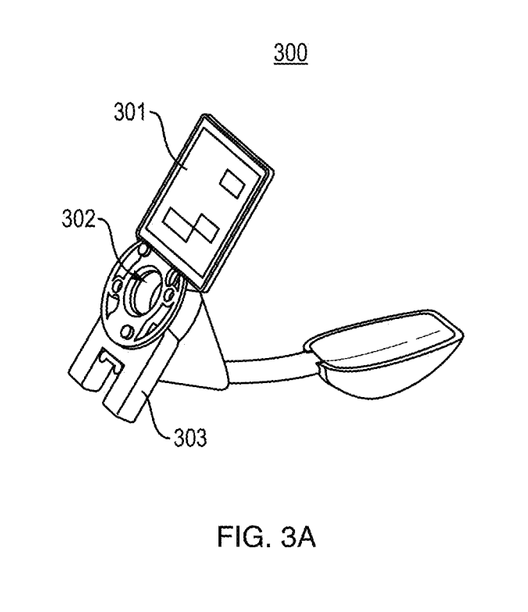
FIG. 3A is a diagram illustrating a tool with a visual 301 for use in an example embodiment of the disclosed method.
Figure 3B:
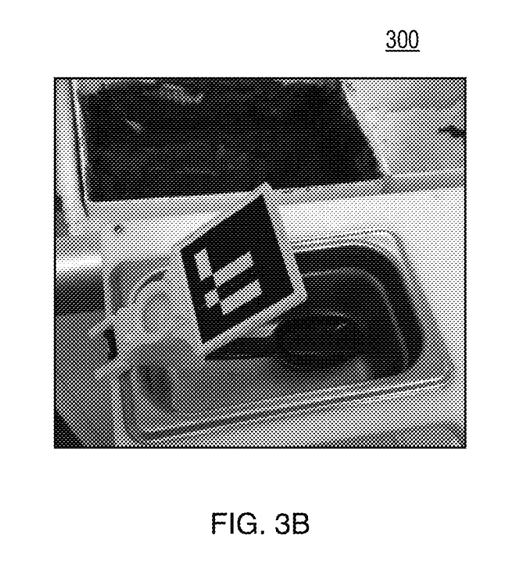
FIG. 3B is a picture of tool with a visual tag in a food service environment for use in an example embodiment of the disclosed method.

FIG. 3A is a diagram illustrating a tool 300 with a visual tag 301 for use in an example embodiment of the disclosed method. FIG. 3B is a picture of the tool 300 with visual tag 301 in a food service environment. The serving tool includes a visual tag 301. Visual tag 301 can be recognized by a robot's vision systems. The pose of visual tag 301 can be determined using the known size of the visual tag 301, the intrinsic and extrinsic parameters of the camera that took the image of the tag, and the measured corner pixel location in the visual tag 301. The pose of tool 300 extrapolated from the pose of visual tag 301. In addition, tool 300 includes a bin clocking feature 303 that allows the tool 300 to rest in a consistent location in the food container, even if the food container stores varying levels of food. This allows a system to more easily determine the pose of tool 300 and determine a trajectory to attach a robot interface to tool 300 at tool interface comment 302.

Figure 4:
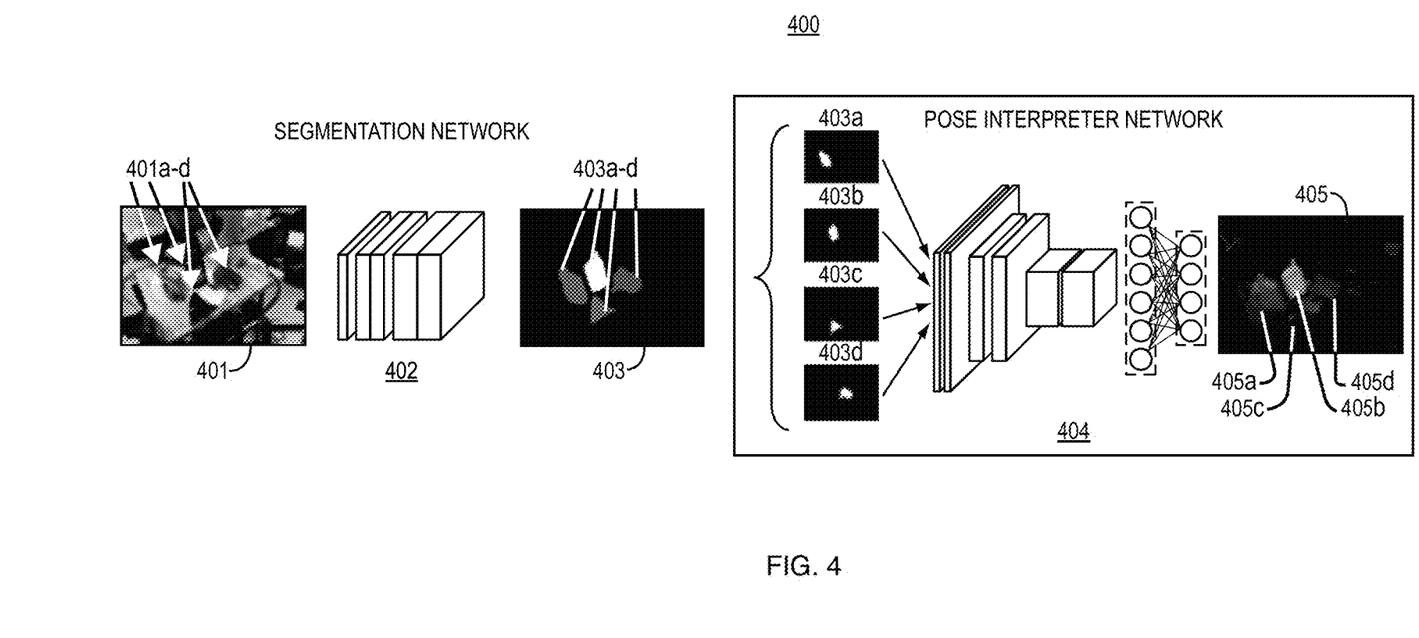
FIG. 4 is a flow diagram illustrating an example embodiment of the disclosed method that uses a pose interpreter neural network to determine the pose a tool.

FIG. 4 is a flow diagram of an example embodiment 400 of the disclosed method that uses a pose interpreter neural network to determine the pose of a tool. The first step includes capturing a color image 401 of an environment containing a set of tools 401a-d. The image may be captured by a camera that produces and RGB image, or other visual system. The camera may be a red, green, blue depth (RGBD) camera. The image 401 is segmented to produce the segmented image 403. The segmented image 403 may be created using neural network 402 in a similar manner as described for example embedment 200 in relation to FIG. 2. In relation to FIG. 4, the neural network 402 may be trained using real data from color images. The segmented image 403 includes segmentation masks 403a-d that are comprised of pixels that correspond to the pixels containing tools 401a-d in the image 401.

Each segmentation mask 403a-d can be analyzed using a pose interpreter neural network 404. The pose interpreted neural network 404 can be trained entirely using synthetic data to determine the pose of an object with known parameters using the segmentation mask of that object. Pose interpreted neural network may apply one of the flowing methods, Dense Object Nets, Pose Interpreter Networks, SE3-Nets, or other similar methods. The pose interpreted neural network 404 provides object poses 405a-d for tools 401a-d using segmentation masks 403a-d. Object poses can include at least six degrees of freedom (X, Y, and Z coordinates, and pitch, roll, and yaw). Picture 405 shows the outputted object poses 405a-d overlaid upon the original image 401. The actual poses of tools 401a-d can be determined from the object poses 405a-d.

One or more of the pose determination methods can be utilized simultaneously. Additionally, one or more of the pose determination methods can be applied to successive observations to allow for repeated or even continuous monitoring. One or more of the pose estimation methods and/or pose determination outputs can be combined with a model of the robot motion, assuming that the utensil is stationary, to improve the estimate of the tool pose using a least-squares estimator.

Once the pose of a tool or a set of tools is determined, the system calculates a trajectory that allows the robot to move its interface to an attachment position and mate with a target tool. Using inputs including the determined pose of a targeted tool, the current pose of the robot, and a set of constraints based on how the attachment mechanism works, a trajectory planning method determines an attachment pose of the robot interface (e.g., from which the attachment mechanism can be triggered to mate the interface with the tool) and calculates a trajectory of the robot that moves the robot interface to the attachment pose. The calculation may use inverse kinematics to determine the robot trajectory for the robot interface to mate with the tool. The trajectory planning method may be executed by a computer or other similar computation device.

For each type of tool, the system pre-computes an allowed trajectory (in the reference frame of the tool), which causes the robot interface to mate with the tool. Based on the measured tool pose, inverse kinematics is used to determine the required robot position trajectory for the robot to mate with the tool. If the robot is a robotic arm, the required robot joint position and space is also determined.

For every portion of the calculated trajectory, the system verifies the robot does not collide with objects in the environment. The location and pose of objects in the environment can be determined using a model of the environment. The model may be a-priori generated, generated by applying the disclosed pose determination methods to all objects in the environment, or directly checking for collision with a point cloud or octomap provided by a depth sensor that is observing the environment. In one embodiment, small collisions may be allowed to remain in the computed trajectory, if a compliant torque controller is used to control the robot. In such an embodiment, the robot can be allowed to make light contact with its environment. In such embodiments, a collision tolerance and a collision angle can be set, and trajectories that have the surface normal below the collision angle and penetration depths less than the collision tolerance remain in the computed trajectory. The system can also verify that the calculated trajectory does not violate any joint, or other physical, limits of the robot.

If a feasible trajectory cannot be calculated, the system may notify the user or operator that the tool is no longer in a reachable position. Alternatively, a trajectory can be calculated that uses the robot to manipulate the tool by pushing with part of the robot or with another tool to move the tool into a position where a feasible mating trajectory can be calculated.

The trajectory planning method can consider additional sets of constraints to ensure the calculated trajectory meets a wide range of potentially desired criteria and properties. The constraints can include but are not limited to:
 a) ensuring the computed trajectory does not cause a collision between the robot and at least one object in the environment;
 b) the computed trajectory is free of causing the targeted tool to move by contacting the targeted tool with the robot prior to reaching the attachment pose;
 c) ensuring the trajectory is does not cause the robot to contact an object that applies a force or torque to the target tool prior to reaching the attachment pose;
 d) the trajectory causes the robot to interact with the tool to move the tool to a new tool pose that facilitates mating; and
 e) the trajectory aligns the robot interface in the attachment pose where a locking mechanism can be engaged to secure the at least one tool to the robot interface.

The trajectory planning method is also capable of determining a trajectory that includes moving the robot interface to a drop-off location, and while at the drop-off location, removing any tool that is currently attached to the robot interface before moving the robot interface to the attachment position.

The method and associated includes several alternative manners of planning and performing the mating between the robot's interface and the target tool. In one embodiment, the attachment pose of the robot interface is sufficiently aligned with the target tool such that the attachment mechanism can be employed at the attachment pose, connecting the interface and the tool without any additional calculations or movements of the robot required. In such embodiments, the trajectory of the robot includes moving the robot interface from its current position to the attachment position and mating the robot interface with the tool. This trajectory can be executed by the robot as acting as an open loop controller.

In alternative embodiments, the attachment pose may only be accurate enough to place the robot interface close enough to the tool where force/torque feedback can be used to begin engaging in a closed-loop capture behavior. In such a situation, the mating is achieved by moving the robotic arm in response to force/torque feedback from contact between the interface and the tool measured by sensors located on the tool and/or robot. This may be accomplished by performing a peg-in-hole insertion by a contact-based controller. A neural network may be utilized by the contact-based controller to provide trajectory adjustment while performing the peg-in-hole insertion.

The disclosed method can also employ other methods of a closed loop mating. One such method is that once the robot interface is within a certain distance to the tool, a proximity sensor located on the robot, robot interface, or tool can be queried to see if the robot is at a desired mating location and the robot can proceed along the trajectory until the proximity sensor is triggered. Alternatively, a visual system may provide visual feedback to continuously detect the pose of the tool can be used while the robot interface is approaching the tool.

The disclosed method, including determining the pose of the target tool, determining the attachment pose of the robot's interface, and calculating the trajectory, can be repeated at any time after they have initially been carried out. This allows for the system to determine updated tool pose, attachment pose, and trajectory in case the tool is pushed, its position is changed, there was an incorrect pose estimate, or sensor error. The pose of the targeted tool can be monitored from the initial determination of its pose until the interface mates with the tool. In this way, the disclosed method and corresponding system can be made to be self-correcting and able to react to unplanned events and disturbances. The pose of the tool may be continually determined, using the disclosed methods, all the way to the mating position, and this can be used for the entire closed loop operation. Pose monitoring can be discontinued at any time and then the approach and/or mating can be run open loop or closed-loop by using another strategy.

When the tool is successfully mating to robot interface, a second trajectory can be computed, using the same methods, to remove the tool from its surrounding environment, such as a food container, in a way which does not violate the robots and/or tools physical limits and is collision free. While the tool is attached to the robot interface, query sensors can continue to monitor for changes while moving which would indicate the tool is attached or is no longer attached. For example, if proximity sensors located on the robot and/or tool are filled to trigger, the pose of the tool changes, and/or the mass attached to the robot decreases, it may be a signal that the tool has been unattached.

Once the robot has performed a task using the tool, the tool can be returned to its original location using the same trajectory determination methods disclosed above. A trajectory is computed from the tools current location to the drop off location that does not violate collision or joint constraints, or other physical constraints of the system such as acceleration or velocity or jerk limits. The drop off location can be located at a pose slightly displaced from the desired resting pose of the tool. Therefore, in the case of placing the tool back into a food container, the tools' food-contact zone is located at a certain depth below the measured surface of the food material in the container. The robot executes the calculated trajectory to move the tool to the drop off location and triggers a release mechanism to release to tool. Gravity may be used to assist in placing the tool at a desired location. A new trajectory may be computed moves the robot away from the released tool without disturbing the tool. This may be accomplished by a closed loop control process that minimizes torque. Alternatively, the released tool's pose can be determined and a collision free trajectory computed. In other embodiments, a neural network can determine a physics-based-model trajectory of the tool after release and a collision free trajectory of the robot can be computed based on this assumed tool trajectory. In another embodiment, the tool is assumed to remain in a static location after release and a collision free trajectory of the robot is computed based on this assumption.

Figure 5:
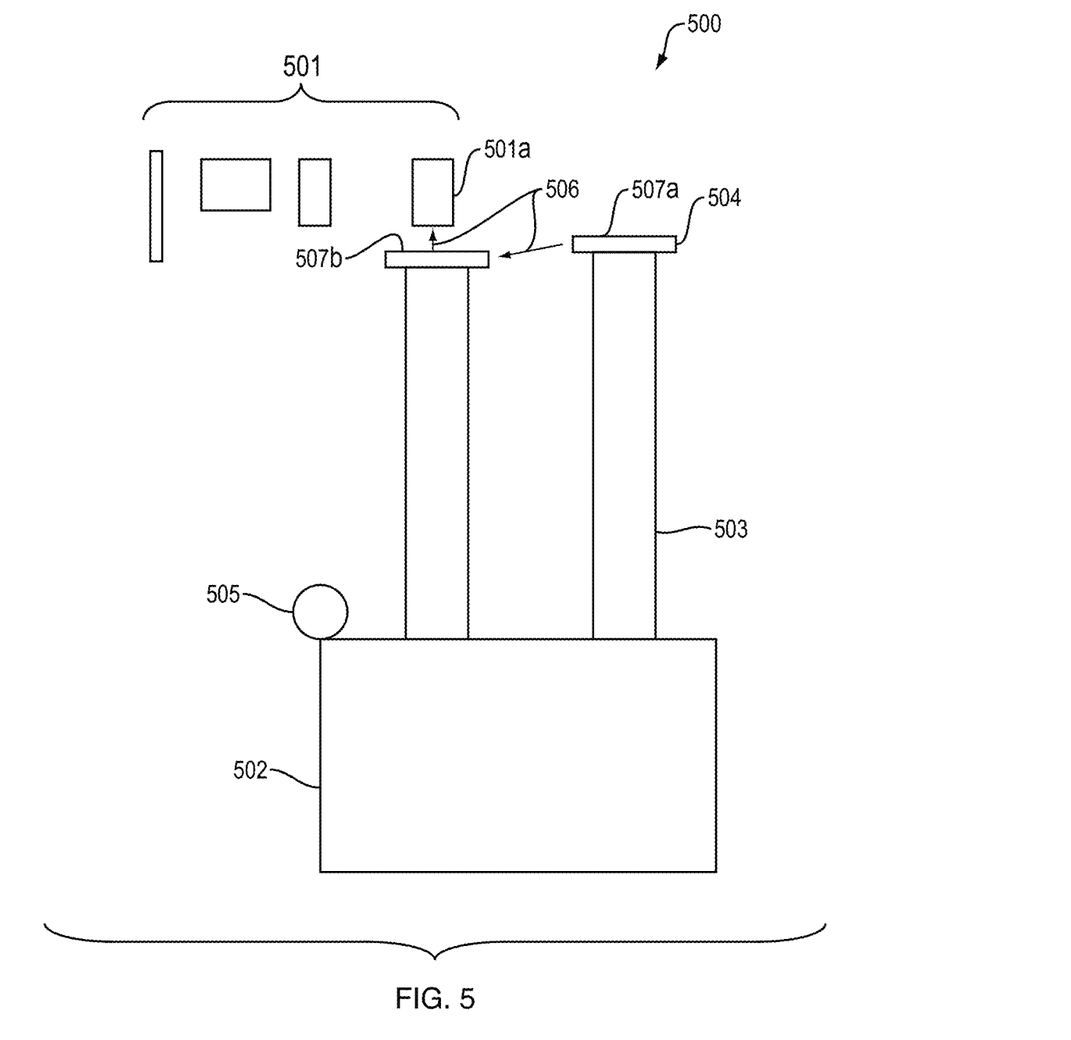
FIG. 5 is a diagram illustrating an example embodiment of a system implementing an example embedment of the disclosed method for attaching to a tool.

FIG. 5 is a diagram illustrating an example embodiment of a system 500 implementing an example embedment of the disclosed method for attaching to a tool. Set of tools 501 includes target tool 501a. A controller 502 includes memory and a processor. The memory and a processor of the controller 502 can receive, store and execute computer code instructions. The computer code instructions include at least one of the methods disclosed for determining the pose of a tool and calculating a trajectory. The memory and a processor that the computer code instructions are not necessarily part of the controller 502 and in some embodiments, are located on a separate component.

The controller 502 is attached and controls to articulated robot arm 503. In other embodiments, the controller 502 is remote from the robot arm 503. Robot arm 503 includes interface 504 that is configured to removably mate with set of tools 501 including target tool 501a. System 500 includes vision system 505. Vision system 505 may be a camera combined with a depth sensor such as a Microsoft Kinect.

The vision system 505 is configured to take at least one image of an environment containing the set of tools 501 including the target tool 501a. The pose of target tool 501a can be determined from the images taken by vision system 505. Based on the determined pose of the target tool 501a an attachment pose 507b for the interface 504 can be determined. The attachment pose 507b is the location and orientation where the mating mechanism of interface 504 can successfully attach to target tool 501a. Both the pose of target tool 501a and the attachment pose 507b of the interface 504 are determined by the controller 502. However, one skilled in the art will understand that the pose determination methods disclosed herein can executed by a range of computer types and similar components.

After, the attachment pose 507b is determined, it is inputted, along with current pose 507a of interface 504 and the mechanical requirements for attaching interface 504 to target tool 501a, to a trajectory planning method which calculates a trajectory 506 for robot arm 503. Additional constraints can be used as inputs for the trajectory planning method to ensure trajectory 506 has specific traits, properties, and/or accomplishes additional tasks. When robot arm 503 executes trajectory 506 it will move robot interface 504 from its current position 507a to the attachment position 507b and mate the interface with target tool 501a. In some embodiments, proximity sensors are mounted on mounted on tools 501, robot interface 504, and robot arm 503 and provide feedback to show that the mating was successful. The robot arm 503, robot interface 504, and/or tools 501 can also include force, torque, and/or visual sensors to provide feedback regarding mating success and to assist in the mating process.

A novel aspect of the approach of the present disclosure is that the method locates the tools before the tools are attached to the arm, and serves as a replacement for a physical tool changer interface.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
   determining, by a computer, a pose of at least one tool, configured to mate with an interface of a robot, within an environment based upon at least one image of the environment;
   determining, by the computer, a target attachment pose of the robot interface, based on the determined tool pose;
   computing, by the computer, an open loop trajectory of the robot that includes moving the robot interface from a first position to the determined target attachment pose of the robot interface to at least one tool;
   computing a closed loop trajectory that analyzes force feedback and torque feedback in response to contact between the robot interface and the tool;
   executing at least one of the computed open loop trajectory and closed loop trajectory of the robot, the executed computed trajectory enabling the robot interface to mate with the at least one tool and subsequently enabling the robot to control the at least one tool.

2. The method of claim 1, wherein determining the tool pose includes:
labeling at least one pixel of the at least on image with an object class or a probability distribution of the object class; and
locating the at least one tool in the at least one image.

3. The method of claim 2, wherein locating the at least one tool the tool includes applying a neural network to the at least one image.

4. The method of claim 2, wherein the at least one image includes a color image and a depth image, and determining the tool pose further includes:
mapping the located at least one tool to a point cloud based on the depth image, to produce a partial 3D representation of the located at least one tool;
comparing the partial 3D representation to a set of models from a model library to find a best matching model;
generating multiple hypotheses, each hypothesis including the best matching model at an estimated tool pose;
selecting a hypothesis based on a comparison of the multiple hypotheses to the partial 3D representation; and
outputting the tool pose of the at least one tool based on the estimated tool pose of the hypothesis selected.

5. The method of claim 1, wherein determining the tool pose of the at least one tool includes applying a scale-invariant transform to the at least one image.

6. The method of claim 1, wherein determining the tool pose includes:
identifying a 2D visual code on the at least one tool in the at least one image; and
determining the tool pose based on an orientation of the 2D visual code.

7. The method of claim 1, wherein the computed trajectory is at least one of:
free of a collision between the robot and at least one object in the environment;
free of causing the at least one tool to move by contacting the at least one tool with the robot prior to reaching the attachment pose;
free of the robot contacting an object that applies a force or torque to the at least one tool prior to reaching the attachment pose;
causes the robot to interact with the tool to move the tool to a new tool pose that facilitates mating; and
aligns the robot interface in the attachment pose where a locking mechanism can be engaged to secure the at least one tool to the robot interface.

8. The method of claim 1, further comprising:
determining, by the computer, an updated tool pose of the at least one tool at a time when determining the pose of at least one tool has been completed;
determining, by the computer, an updated target attachment pose of the robot interface, based on the updated tool pose; and
computing, by the computer, an updated trajectory based on the updated attachment pose.

9. The method of claim 1, where the computed trajectory additionally includes:
moving the robot interface to a drop-off location prior to moving the robot interface to the attachment pose; and
removing an attached tool from the robot interface at the drop-off location.

10. The method of claim 1, wherein mating the robot interface with the at least one tool includes performing a peg-in-hole insertion, by a contact-based controller, using at least one of a force and a torque sensor, the insertion employing the determined tool pose as an initial pose estimate of the at least one tool.

11. The method of claim 10, wherein mating the robot interface with the at least one tool further includes employing, by the contact-based controller, a neural network that provides at least one trajectory adjustment while performing the peg-in-hole insertion.

12. The method of claim 1, wherein the robot as an open loop controller executes the trajectory.

13. The method of claim 12, further comprising determining if the mating was successful based on at least one of a proximity sensor mounted on at least one tool and the robot, visual feedback, force feedback, and torque feedback.

14. The method of claim 1, wherein executing the computed trajectory of the robot moves the robot to an actual attachment pose that is within a 1.0 mm distance from the determined target attachment pose, within a 0.8 degree clocking offset, and within a 2.0 degree twisting offset of the determined target attachment pose.

15. A system comprising:
a processor; and
a memory with computer code instructions stored thereon, the processor and the memory, with the computer code instructions, being configured to cause the system to:
determining a pose of at least one tool, configured to mate with an interface of a robot, within an environment based upon at least one image of the environment;
determining a target attachment pose of the robot interface, based on the determined tool pose;
computing an open loop trajectory of the robot that includes moving the robot interface from a first position to the determined target attachment pose of the robot interface to at least one tool;
computing a closed loop trajectory that analyzes force feedback and torque feedback in response to contact between the robot interface and the tool;
executing at least one of the computed open loop trajectory and the computed closed loop trajectory of the robot, the executed computed trajectory enabling the robot interface to mate with the at least one tool and subsequently enabling the robot to control the at least one tool.

16. The system of claim 15, wherein the at least one image includes an RGB image, and determining the tool pose includes:
segmenting the RGB image;
labeling at least one pixel of the segmented RGB image with an object class or a probability distribution of the object class; and
locating the at least one tool in the segmented image.

17. The system of claim 16, wherein determining the tool pose further includes applying a neural network to the located tool in the segmented image.

18. The system of claim 16, wherein the at least one image includes the RGB image and a depth image, and determining the pose further includes:
mapping the located at least one tool to a point cloud based on the depth image, to produce a partial 3D representation of the located at least one tool;
comparing the partial 3D representation to a set of models from a model library to find a best matching model;
generating multiple hypotheses, each hypothesis including the best matching model at an estimated tool pose;
selecting a hypothesis based on a comparison of the multiple hypotheses to the partial 3D representation; and outputting the tool pose of the at least one tool based on the estimated tool pose of the hypothesis selected.

19. The system of claim 15, wherein determining the pose of the at least one tool includes applying a scale-invariant feature transform to the at least one image.

20. The system of claim 15, wherein determining the pose includes:
- identifying a 2D visual code on the at least one tool in the at least one image; and
- determining the pose based on an orientation of the 2D visual code.

* * * * *